Figure 1:
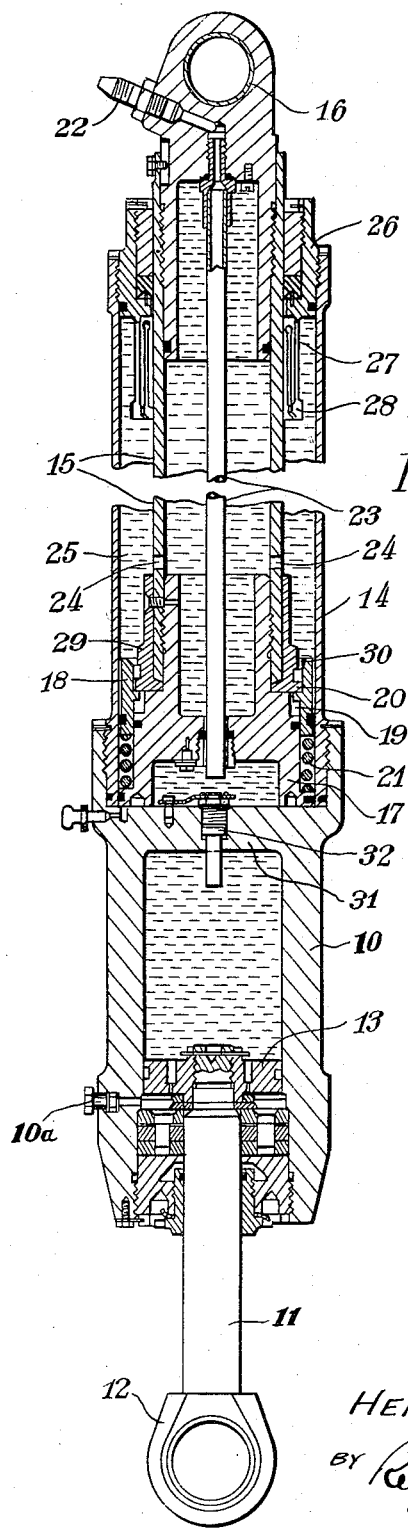

Aug. 7, 1951 H. SHAWBROOK 2,563,194
LIQUID SPRING RESILIENT UNIT
Filed Aug. 20, 1946 2 Sheets-Sheet 1

INVENTOR
HENRY SHAWBROOK,
BY Reynolds & Beach
ATTORNEYS

Aug. 7, 1951  H. SHAWBROOK  2,563,194
LIQUID SPRING RESILIENT UNIT
Filed Aug. 20, 1946  2 Sheets-Sheet 2
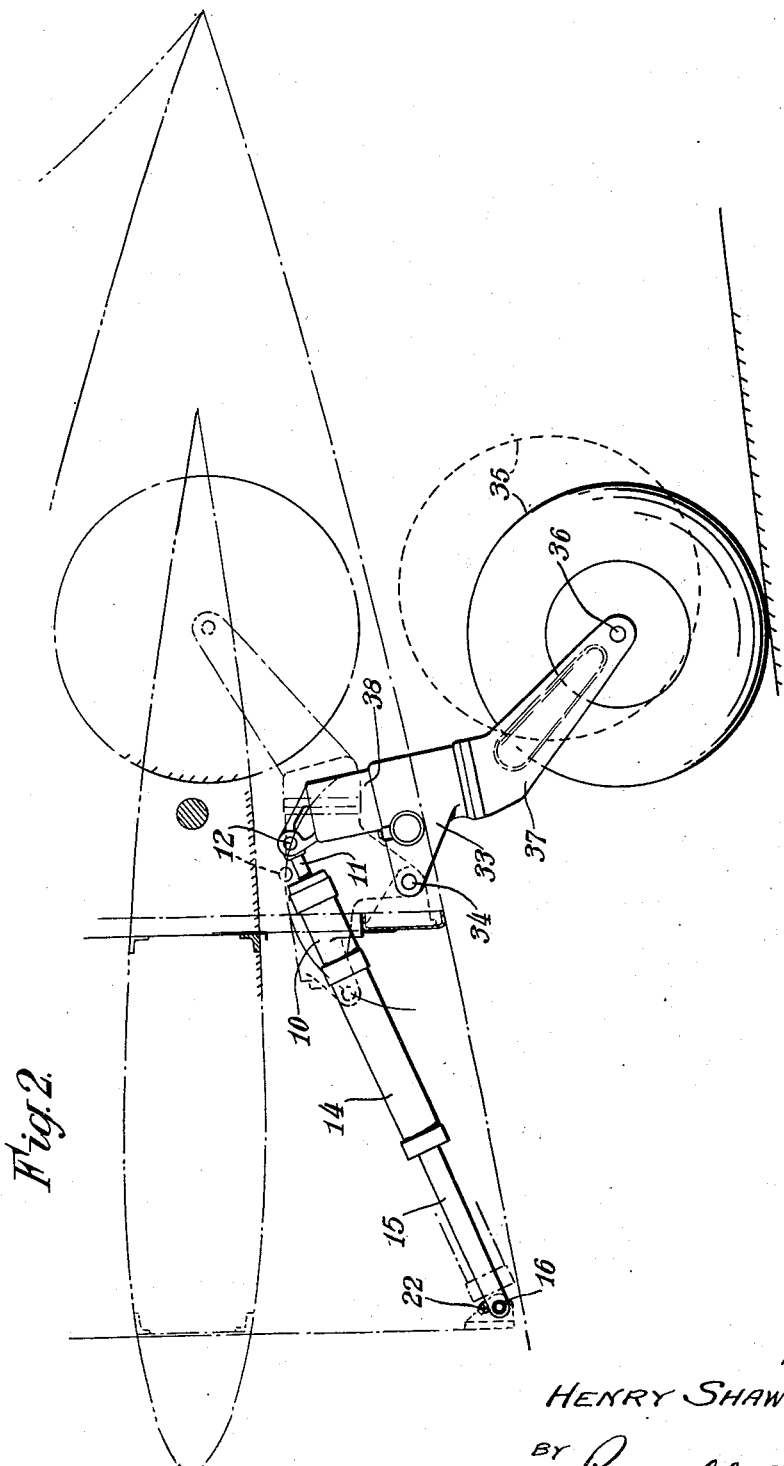
INVENTOR
HENRY SHAWBROOK,
BY Reynolds + Beach
ATTORNEYS Patented Aug. 7, 1951

2,563,194

UNITED STATES PATENT OFFICE 2,563,194

LIQUID SPRING RESILIENT UNIT

Henry Shawbrook, Cheltenham, England, assignor to Dowty Equipment Limited, Cheltenham, England Application August 20, 1946, Serial No. 691,737
In Great Britain June 4, 1945

4 Claims. (Cl. 244—102)

There is a type of resilient device in which a plunger operates in a chamber for resilient compression of liquid entrapped in the chamber. Such devices are conveniently known as liquid springs and examples of them are found in the specifications of the prior United States Patents 2,333,095, 2,333,096 and 2,346,667 granted to George H. Dowty and the co-pending application for United States Letters Patent Serial No. 313,400, now abandoned, filed on the 11th of January 1940 in the name of George H. Dowty.

In many cases, for example where such devices are employed to provide resilience in aircraft landing element mountings, the liquid pressure internally of the chamber is substantially that of external atmosphere when the device is relieved of load. A static condition of that sort occurs, for instance, in the application of liquid springs to aircraft when the aircraft is in flight.

During maximum load conditions, on the other hand, such as may occur when the landing element is assuming the load at touching down, the internal liquid pressure becomes extremely high, and it is virtually inevitable that some leakage shall occur from the closed liquid-filled chamber. Unless the losses sustained thus be promptly recuperated, they will become cumulative, and eventually the liquid spring will no longer extend to the full, and will fail to function as intended. Nevertheless, any recuperating or topping up connection from an external source can be expected to constitute merely another source of leakage, since the pressure differential between the liquid spring unit at maximum load and the topping up source would ordinarily be greater than valve means or the like, between them, could be expected to withstand. It is, therefore, a very real problem to maintain the liquid spring unit constantly full of liquid without at the same time inviting further or supplemental leakage by the very means intended to make the initial leakage.

It is a primary object of the present invention to provide means for recuperating a liquid spring unit by automatic topping up of the liquid to make good leakage and thereby to keep the liquid compression chamber completely full of liquid. More specifically, it is an object to accomplish such automatic topping up by hydraulic means—a hydraulic jack, for instance—directly connected hydraulically with the liquid spring, and operatively associated with the latter in such manner that maximum loading of such hydraulic means occurs at a time when the liquid spring is substantially unloaded, or is loaded to a minimum, before each principal use of the latter, and at such times exceeds the minimum loading of the liquid spring, although it is still far less than the operating loads on the latter, the topping up of the liquid spring is automatically accomplished in advance of use thereof, the liquid spring is always fully ready for use when needed, and yet there is no appreciable likelihood of disturbance of the normal functioning of the associated hydraulic means.

The present invention consists broadly in the combination of a liquid spring unit with a hydraulic system communicating with the compression chamber of the liquid spring unit through a non-return valve for recuperation of liquid in a substantially static or minimum internal loading condition of the liquid spring unit.

More particularly, as the invention may be incorporated in an aircraft, it concerns the provision of an arrangement of resilient landing element mounting means involving liquid spring means coupled up with hydraulic pressure means, such as an extending jack, for ensuring that immediately prior to landing the then unloaded or lightly loaded liquid spring means shall be subject to superior pressure of the then moderately loaded hydraulic means to make good any leakage which may have occurred in the former and thereby to ensure that the liquid spring means shall be completely full of liquid at the beginning of each taxying run.

Further objects of the invention will become apparent from the ensuing description.

In order that it may be clearly understood and readily carried into effect, the invention is hereinafter described with reference to the accompanying diagrammatic drawings, of which:

Figure 1 is a sectional elevation of a combined liquid spring shock absorber and retraction jack operating in accordance with the present invention and for installation in an aircraft landing element retractable mounting, while Figure 2 is a fragmentary side elevation of the tail end of an aircraft fuselage with a tail landing element mounting embodying a combined shock absorber and retraction jack in accordance with Figure 1.

In Figure 2 the mounting is shown in full lines in the normal extended and unloaded condition which prevails, for instance, when the undercarriage has been extended with the aircraft still in flight preparatory to landing. The dotted line showing of certain fundamental parts represents the maximum yield deformation of the mounting for shock absorption under landing and taxying loads and the chain line showing of the fundamental parts reveals the retracted condition of the mounting. The rear end of the fuselage and position of the tail plane are also indicated in chain lines.

Referring first to Figure 1, the reference numeral 10 represents the compression chamber of a liquid spring unit in which the shock absorber plunger 11 operates telescopically being suitably glanded in the mouth of the cylinder 10. The shock absorber plunger 11 incorporates a pin joint fitting 12 for attachment to the movable element of the landing element mounting. The damping head 13, which is suitably ported, operates purely for damping purposes, preferably with differential damping effect primarily for the purpose of preventing excessive recoil movement of the plunger relative to the cylinder on relief of load in landing and taxying conditions. The whole available space in the cylinder 10, with the plunger fully extended as shown in Figures 1 and 2, is completely filled with liquid and with compression load forcing the plunger 11 into the liquid, the liquid is compressed in conformity with the increasing volume of plunger entering the cylinder.

For filling and bleeding purposes, the filler plug 10a is provided.

The compression pressures involved in liquid spring devices are, of course, quite high and, on the present basis of development, the pressures may go as high as 50,000 lbs. per square inch. It will be appreciated that, in those circumstances, the provision of a completely leakproof gland operating over any reasonable period between surfacing operations can be achieved only at considerable difficulty, complication and expense, while, furthermore, quite apart from the question of leakage, aircraft frequently operate under widely varying temperature conditions such as may well cause a considerable volume change of the liquid in the cylinder 10. On the other hand, it is reckoned to be of considerable importance that the shock absorber cylinder 10 in this liquid springing unit should be completely full of liquid for really successful operational purposes. Some form of recuperation is, therefore, very desirable and the present invention is entirely directed to that question with a view to the general simplification of the glanding and the tolerance of volumetric changes in the entrapped liquid within the shock absorber cylinder 10.

In modern aircraft most landing element mountings are retractable and quite frequently hydraulic systems are employed for operation of ancillary equipment. Typically, for example, landing element mountings are operated for retraction and extension by hydraulic jacks through suitable control valves controlling the direction of actuating fluid flow to and from the jack and thereby to operate the jack for retraction and extension of the mounting as required.

In the arrangement as seen in Figure 1, the cylinder 10 of the liquid spring unit has been associated with a hydraulically operated telescopic jack and this, in aircraft with retractable landing element mounting, is a point of considerable importance, because operation of the jack for extension purposes induces a considerable pressure in the jack cylinder and as the jack is necessarily operated for extension immediately prior to the aircraft coming in to land, it follows that by providing communication between the jack cylinder and the liquid spring shock absorber cylinder 10 any recuperation of liquid volume required can automatically be achieved each time the landing element mounting is extended so that the shock absorber cylinder 10 is completely full of liquid when the aircraft touches down on its taxying run.

Reverting to the specific arrangement shown in Figure 1, it will be seen that the end of the shock absorber cylinder 10 remote from the plunger receives the tubular jack cylinder 14 which is suitably glanded at its outer end and within which the hollow plunger 15 operates. The outer end of the jack plunger 15 is provided with a pin joint 16 for attachment to some convenient fixed anchorage on the aircraft structure. It will be seen that the jack plunger 15 is smaller in cross section than the bore of the jack cylinder 14 and has at its outer end a piston 17 fitting the bore and the piston is suitably glanded to prevent leakage past it. The skirt of the piston 17 is cut back for the reception of the lock sleeve 18 which is suitably glanded to prevent leakage past it and is slidable with respect to the piston 17 within the limits defined between the stops 19 and 20 and the compression spring 21 loads the lock sleeve 18 toward the stop 20. As shown, the jack plunger 15 is fully retracted and, for extension of the jack, actuating fluid is supplied at pressure from the hydraulic system on the aircraft under control of a selector valve through the fluid flow connection 22 and along the hollow centre tube 23 to the back of the piston 17. A similar fluid flow connection, alongside the connection 22 but not seen in Figure 1, leads into the interior of the hollow plunger 15 to act on the piston for retraction of the jack plunger, actuating fluid flow being able to act not only on the cross sectional area of the piston corresponding to the diameter of the bore of the jack plunger, but also finding its way through the ports 24 into the annulus 25.

The gland fitting at the outer end of the jack cylinder 14 includes an end cap 26 presenting into the annulus 25 a ring of digitated spring locking tongues 27 each having at its inner end an enlarged head or locking dog 28.

In operation, as the jack plunger 15 approaches its fully extended setting, the enlargement 29 on a collar adjacent the piston forces the heads 28 of the spring tongues 27 outwardly so that they engage the end of the lock sleeve 18 and cause it to move back against the pressure exerted by the compression spring 21. After the plunger, with its continued extension movement, takes the enlargement 29 past the heads 28 of the spring locking tongues, the tongues spring inwardly so that the heads 28 seat in the recess 30 between the stop 20 and the enlargement 29, whereupon the lock sleeve 18 moves along under the influence of the locking spring 21 until it abuts the stop 20 to lock the heads 28 securely engaged. Once so locked, the jack is securely held quite positively in the extended setting until fluid pressure is applied for retraction, whereupon such pressure acts through the hollow plunger 15, ports 24, and in the annulus 25 initially to force back the lock sleeve 18 and permit disengagement of the lock, whereafter the piston 17 with the plunger 15 is caused to retract into the jack cylinder 14 allowing the lock sleeve 18 again to move under the influence of the spring 21 into the limit position dictated by the stop 20.

As shown in Figure 1, and as will later be understood by the description relating to Figure 2, positive locking is provided at the outer end of the jack cylinder for securing the jack plunger 15 in the fully extended setting relative to the jack cylinder 14. The geometry of the landing element mounting described later with reference to Figure 2 being such that the extended condition of the jack corresponds to full extension of the mounting into a position ready for alighting and, whereas for absolute security positive locking is then desirable, positive locking is not necessary in the majority of cases with the jack in the fully retracted condition corresponding to the retracted condition of the landing element mounting. If, however, positive locking should be required for the retracted setting of the jack it is merely a question of providing a digitated locking ring and lock sleeve at the other side of the piston.

It will be seen that the blind end of the liquid spring cylinder constitutes virtually a partition 31 dividing the liquid spring compression chamber from the interior of the jack cylinder 14 and for recuperation purposes a non-return valve 32 extends through the partition 31. The non-return valve can be of any type suitable for withstanding high pressures involved with liquid compression in the liquid spring shock absorber cylinder 10, but it is preferred to employ a non-return valve of the form described in British specification No. 577,637. The non-return valve 32 effectually seals against leakage from the interior of the liquid spring shock absorber cylinder 10 into the jack cylinder 14, at all pressures or relative pressures in such cylinders, but if for any reason if for example leakage occurs along the plunger 11—a reduction of volume of liquid occurs in the cylinder 10 the non-return valve 32 is readily opened when actuating fluid pressure is applied to the back end of the piston 17 through the centre tube 23 of the jack and any loss through leakage or volumetric change is thus made good each time the jack is operated for extension.

Referring now to Figure 2, it will be seen that the tailwheel landing element mounting geometry involves the combined liquid spring shock absorber and retraction jack described with reference to Figure 1 and here in Figure 2 the reference numerals designating the various parts of that unit which are seen in Figure 2 correspond with their showing in Figure 1. The reference numeral 33 indicates a bracket swingable up and down for retraction and extension about the retraction pivot 34. The tailwheel 35 is mounted on the spindle 36 which is carried by the fork fitting 37 which swivels in the bracket 33 to provide for castoring action. Self-centering and/or shimmy damping means may be incorporated in accordance with the now fairly common practice in tailwheel landing element mounting.

It will be seen that in Figure 2 the pin joint 16 is connected to a covenient fixed anchorage in the fuselage, whereas the pin joint 12 is connected to the top of the tailwheel pillar housing 38. Thus in the fully extended condition, as seen in full lines in Figure 2, with no load on the tailwheel, the jack plunger 15 is locked in the fully extended condition. To reach that setting from the retracted condition, seen in chain lines, pressure has had to be applied for jack extension and, in consequences, any loss of volume in the liquid spring compression chamber 10 has been made up, by passage through the non-return valve 32 from the upper chamber to the lower, thus ensuring that when the aircraft lands the liquid spring shock absorber cylinder 10 is completely full of liquid for successful operation on the taxying run.

The hydraulic system can be the ordinary hydraulic system usually provided on aircraft for the operation of ancillary equipment and is coupled up by flow and return pipe lines with fluid pressure connections on the outer end of the jack plunger 15, of which connections one is seen at 22 in the drawings. The direction of fluid flow similarly is controlled by any usual form of selector valve, as is normal.

The fact that liquid spring units operate at high pressures in no way interferes with recuperation in the arrangement according to the present invention, because, as should be apparent, the liquid spring unit is wholly or almost completely relieved of load when recuperation is taking place.

The employment of a liquid spring in a mounting of the kind shown in Figure 2 has considerable advantage over oleo-pneumatic, pneumatic or spring types of shock absorber, because, though a liquid spring unit is subject to high internal pressure loading, it is capable of adequately absorbing the shocks induced by landing and taxying loads in very short shock absorber travel, as will be apparent from the comparison of the position of the pin joint 12 seen, in full lines, in the unloaded condition of the extended mounting, with the dotted line showing representing the position which the pin joint 12 occupies under maximum deflection load. The corresponding maximum deflection setting of the tailwheel is also seen in dotted lines in Figure 2.

I claim:

1. In combination, a closed and completely liquid-filled chamber and a plunger movable thereinto under the influence of externally applied compression loads, to constitute a liquid spring, the plunger being movable from said chamber under the influence of the restoring forces of the liquid entrapped in said chamber, to a position of greatest extension corresponding to minimum loading upon the entapped liquid; a jack cylinder cooperating with said liquid spring, a jack plunger within and movable from said jack cylinder under the influence of a liquid supplied to said cylinder under pressure at a value in excess of the minimum pressure upon the liquid entrapped within said liquid spring chamber; and hydraulic means interconnecting said cylinder and said chamber, and biased for movement of liquid from the cylinder into the chamber automatically whenever the pressure within the jack cylinder exceeds the pressure within the liquid spring chamber.

2. In an extensible device, in combination, a housing partitioned to define a jack cylinder and a liquid spring chamber; a liquid spring plunger movable into said chamber under the influence of externally applied compression loads and movable from said chamber under the influence of the restoring forces of the liquid entrapped in said chamber, a jack plunger both received in and movable from said jack cylinder under the influence of a liquid under pressure supplied thereinto, the intervening partition having an opening affording interconnection between said cylinder and said chamber, and a non-return valve controlling said opening and arranged to open under the influence of applied jack cylinder pressure of a value in excess of minimum liquid spring chamber pressure.

3. The combination of claim 2, for use in an aircraft, including in addition a ground-engaging landing element and a support, and wherein the housing is operatively interposed between said landing element and said support in position to be compressed by landing loads while the liquid spring plunger and the jack plunger are both extended, and said housing and its jack plunger being organized and arranged to retract said landing element upon inward movement of the jack plunger into its jack cylinder.

4. In combination, a closed chamber, a plunger movable into said chamber under the influence of externally applied compression loads, liquid completely filling said chamber at all times and entrapped therein to be compressed by inward movement of said plunger, and by its resilience to urge the plunger outwardly upon relief of the compressive load and thereby to reduce pressure upon the entrapped liquid to a minimum value, a separate hydraulically operable device in direct hydraulic communication with the interior of said chamber, and filled at all times with a liquid which, while said device is inactive, is at a pressure not substantially greater than the minimum pressure of the chamber's liquid, means to supply to said device additional liquid under a pressure in excess of the chamber liquid's minimum pressure, for actuation of said device, and valve means intermediate and controlling communication between said chamber and said device, and arranged to be closed automatically under the influence of superior chamber pressure to block escape of liquid from the chamber, and to be opened automatically under the influence of superior pressure in said device to replenish from the latter any deficiency of liquid within the chamber.

HENRY SHAWBROOK.

REFERENCES CITED

The following references are of record in the file of this patent:

UNITED STATES PATENTS

| Number | Name | Date |
| --- | --- | --- |
| 1,113,370 | Ostendorf | Oct. 13, 1914 |
| 1,768,696 | Laddon | July 1, 1930 |
| 2,333,096 | Dowty | Nov. 2, 1943 |
| 2,346,667 | Dowty | Apr. 18, 1944 |
| 2,392,892 | Ward | Jan. 15, 1946 |

FOREIGN PATENTS

| Number | Country | Date |
| --- | --- | --- |
| 105,053 | Great Britain | Mar. 21, 1917 |

Certificate of Correction

Patent No. 2,563,194 August 7, 1951

HENRY SHAWBROOK

It is hereby certified that error appears in the printed specification of the above numbered patent requiring correction as follows:

Column 1, line 42, after "make" insert *good*; column 6, line 44, for "entapped" read *entrapped*;

and that the said Letters Patent should be read as corrected above, so that the same may conform to the record of the case in the Patent Office.

Signed and sealed this 12th day of February, A. D. 1952.

[SEAL]

THOMAS F. MURPHY,
*Assistant Commissioner of Patents.*